United States Patent [19]
Aono

[11] Patent Number: 5,162,898
[45] Date of Patent: Nov. 10, 1992

[54] COLOR IMAGE DATA COMPRESSING APPARATUS AND METHOD

[75] Inventor: Tomoko Aono, Tenri, Japan

[73] Assignee: Sharp Kabushiki Kaisha, Osaka, Japan

[21] Appl. No.: 416,951

[22] Filed: Oct. 4, 1989

[30] Foreign Application Priority Data

Oct. 6, 1988 [JP] Japan .................. 63-254377

[51] Int. Cl.⁵ ............................................ H04N 9/32
[52] U.S. Cl. ..................................... 358/13; 358/133
[58] Field of Search ................... 358/133, 141, 13, 310

[56] References Cited

U.S. PATENT DOCUMENTS 4,023,199  5/1977  Netravali et al. .............. 358/13
4,467,346  8/1984  Mori ............................ 358/13

OTHER PUBLICATIONS

Proceeding of the IEEE, vol. 69, No. 3, Mar. 1981, pp. 349–384, "Image Data Compression: A Review".
Data Compression by A. J. Johnson, pp. 336–353.
Japanese Article, vol. J67-B, No. 12, Dec. 1984, entitled "High Efficiency Encoding of Colored Pictures Based on Visual Property".
Japanese Article, vol. 16, No. 5 (1987), entitled "A Method of Color Image Quantization Adaptive to Foreground and Background Regions".

Primary Examiner—James J. Groody
Assistant Examiner—David E. Harvey
Attorney, Agent, or Firm—Sandler, Greenblum & Bernstein

[57] ABSTRACT

A compressing apparatus for compressing color image data including R, G and B data. The apparatus includes a converter for converting the R, G and B data into luminance data and chrominance data, and an encoder. The encoder encodes the luminance data to compressed luminance data, through fine quantization at regions where human eyes are sensitive, and through coarse quantization at regions where human eyes are less sensitive, such as, e.g., in dark or bright areas. The encoder also encodes the chrominance data to compressed chrominance data in a similar manner.

7 Claims, 6 Drawing Sheets

COLOR IMAGE DATA COMPRESSING APPARATUS AND METHOD

BACKGROUND OF THE INVENTION

1. Field of the Invention

The present invention relates to method and apparatus for encoding and decoding color image data for efficiently compressing and storing the color image data.

2. Description of the Prior Art

It is known in the art to compress the color image data by converting image data comprising red (R), green (G) and blue (B) signals, expressed in RGB coding system, to image data comprising a luminance signal (Y) and color difference (chrominance) signal (I, Q), expressed in a YIQ coding system. In the RGB coding system, there is a typically a large amount of redundancy due to frequent correlations between the colors. However, in the YIQ coding system, such a redundancy is eliminated because the luminance and chrominance signals are expressed with orthogonal functions. Thus, by the conversion of image data from an RGB system to a YIQ system, the amount of image data can be reduced greatly. Furthermore, under the YIQ system, since the human eyes are less sensitive to chrominance than luminance, the chrominance signal (I, Q) can be coded with rough quantization, resulting in the reduction of the total data amount.

In FIG. 1, a prior art converter employing a prior art encoding and decoding system is shown for converting image data from an RGB system to a YIQ system, thereby compressing color image data to be stored, for example, in a floppy disk. A full color still picture image, which is expressed by a digital signal in the RGB system (having RGB data including R data, G data and B data) is applied to image input device 11. The RGB data is converted to digital signals in the YIQ system (having YIQ data including Y data, I data and Q data) by YIQ converter 12. The conversion in YIQ converter 12 is carried out based on the following equation (1):

$$\begin{vmatrix} Y \\ I \\ Q \end{vmatrix} = \begin{vmatrix} 0.299 & 0.587 & 0.114 \\ 0.596 & -0.274 & -0.322 \\ 0.211 & -0.523 & 0.312 \end{vmatrix} \begin{vmatrix} R \\ G \\ B \end{vmatrix} \quad (1)$$

The converted YIQ data is applied to encoder 13 in which the Y data, I data and Q data are quantized and encoded to Y1 data, I1 data and Q1 data. The encoded data are recorded (e.g., on a floppy disk) in a recording/play device 14. According to this prior art encoding system, Y, I and Q data are encoded linearly to Y1, I1 and Q1 data, as shown in the graphs depicted in FIGS. 2a, 2b and 2c, in which the abscissas and ordinates, respectively, represent input and output data of encoder 13. FIG. 2a shows that each eight bit word of luminance data (Y), which express e.g., one out of 256 levels (0 through 255), is linearly encoded to an eight bit words of luminance data (Y1) which can express the same 256 levels. FIG. 2b shows that each eight bit word of first chrominance data (I), which can express up to 256 levels (−128 through 127), is linearly encoded to a five bit word of first chrominance data (I1) which can express 32 levels. FIG. 2c shows that each eight bit word of second chrominance data (Q), which can express up to 256 levels (−128 through 127) is linearly encoded to a four bit word of second chrominance data (Q1) which can express 16 levels. Since the human eyes are less sensitive to variations in chrominance than in luminance, the first and second chrominance signals (I, Q) are coded with rough quantization.

Then, in order to display the image on the display device 17, the recorded Y1, I1 and Q1 data are read out and linearly decoded in decoder 15 back to Y, I and Q data. The decoding in decoder 15 is effected in the reverse relationship, in terms of input and output, of the graphs shown in FIGS. 2a to 2c. Thereafter, the Y, I and Q data are converted to R, G and B data in RGB converter 16. The conversion in RGB converter 16 is carried out based on the following equation (2).

$$\begin{vmatrix} R \\ G \\ B \end{vmatrix} = \begin{vmatrix} 1.0 & 0.956 & 0.621 \\ 1.0 & -0.272 & -0.647 \\ 1.0 & -1.106 & 1.703 \end{vmatrix} \begin{vmatrix} Y \\ I \\ Q \end{vmatrix} \quad (2)$$

The above described color image data encoding and decoding method does not taken into consideration the visual recognition characteristics of human eyes. Thus, the compressed data which is stored, e.g., on floppy disk, is not properly compressed.

SUMMARY OF THE INVENTION

In the light of the above, the essential object of the present invention is to provide an improved method and apparatus for compressing color image data more efficiently.

It is the human eyes that evaluate the quality of the reproduced image. Thus, by studying and considering the visual recognition characteristics of the human eyes, the YIQ data can be more efficiently compressed in encoder 13 by changing the step size of the YIQ data, as effected in the encoder. Such a change of the step size should be done with a consideration that human eyes are more sensitive to luminance change, than chrominance change and that human eyes are more sensitive to edges of items shown in the image than flat areas in such items.

In accomplishing these and other objects, a compressing apparatus is provided which comprises a first converter for converting R, G and B data into luminance data (Y) and chrominance data (I, Q); a first encoder for encoding the luminance data (Y) into compressed luminance data (Y2) with fine quantization at regions where human eyes are sensitive and with coarse quantization at regions where human eyes are less sensitive; and a second encoder for encoding the chrominance data (I, Q) into compressed chrominance data (I2, Q2), through fine quantization at regions where human eyes are sensitive and with coarse quantization at regions where human eyes are less sensitive.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

First Embodiment

Figure 1:
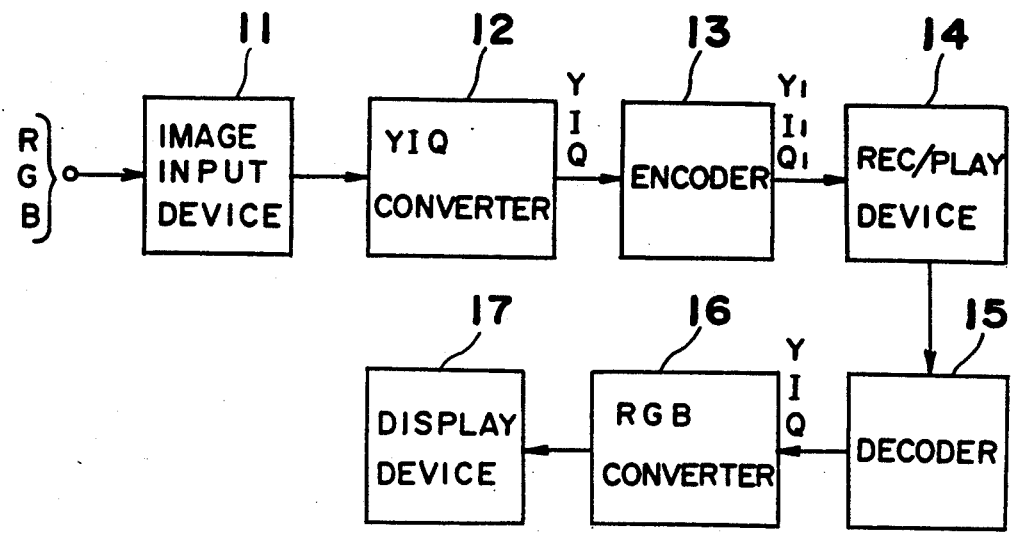
FIG. 1 is a block diagram of a prior art converter employing a prior art encoding and decoding system for converting image data from an RGB system to a YIQ system.
Figure 3:
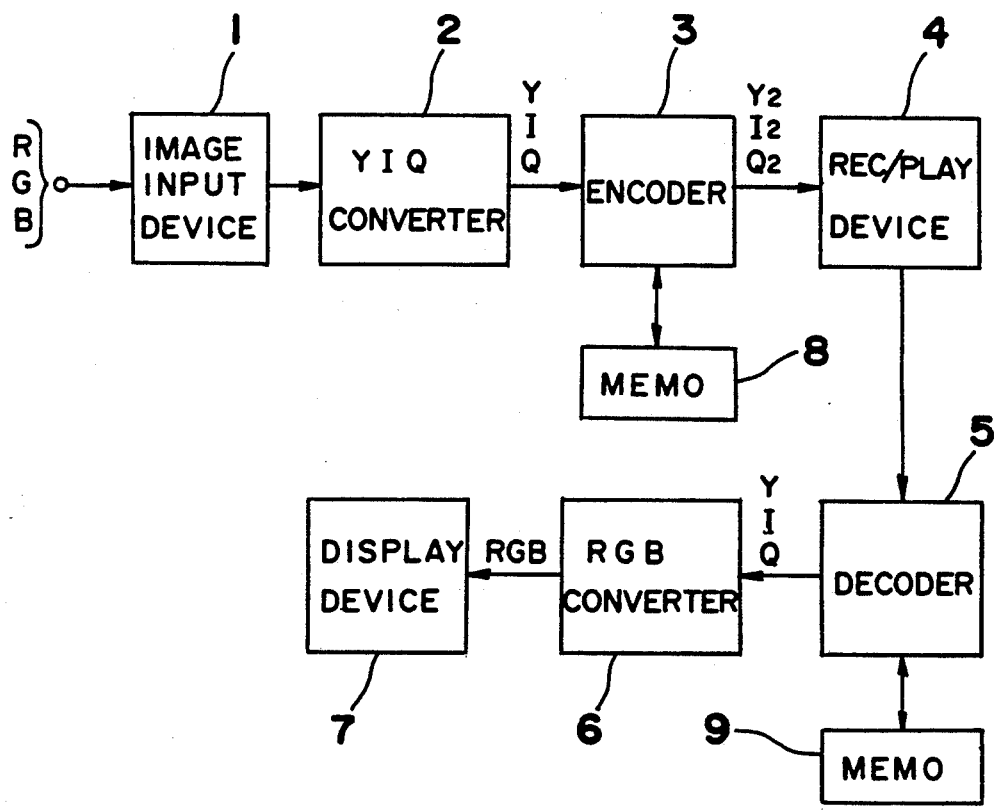
FIG. 3 is a block diagram of a converter employing a encoding and decoding system according to the present invention.

Referring to FIG. 3, a converter employing an encoding and decoding system according to the present invention is shown. The converter comprises a video input device 1, a YIQ converter 2, an encoder 3 coupled with a first memory 8, a recording/play device 4, a decoder 5 coupled with a second memory 9, an RGB converter 6 and display device 7.

Recording

Image input device 1 receives RGB signal of a full color still picture image as obtained by, e.g., an image scanner (not shown) and produces RGB data in digital format.

Using the formula (1), YIQ converter 2 converts the R, G and B data to Y, I and Q data, such that Y data, I data and Q data are each expressed by eight bit digits.

Figure 2A:
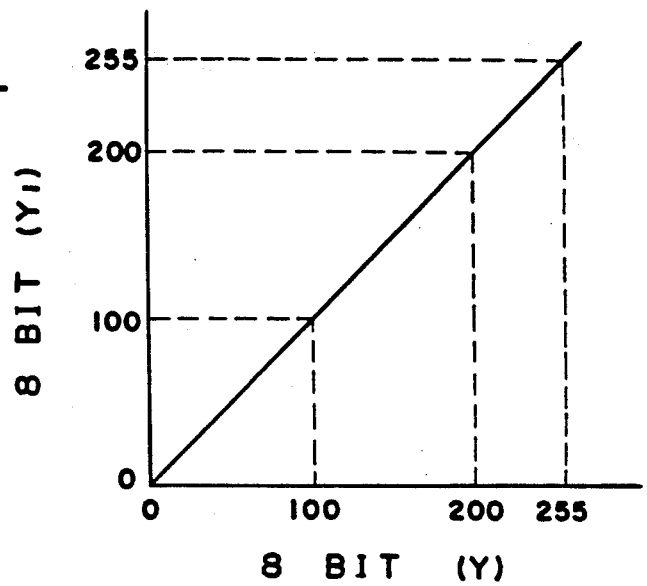
FIGS. 2a, 2b and 2c are graphs showing encoding of data Y, I and Q to data Y1, I1 and Q1, according to the prior art.
Figure 2B:
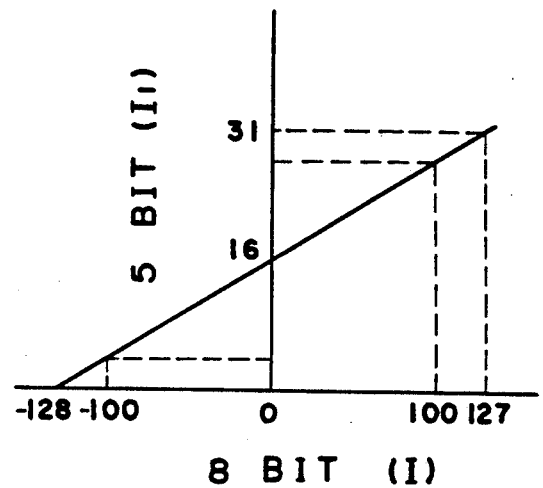
Figure 2C:
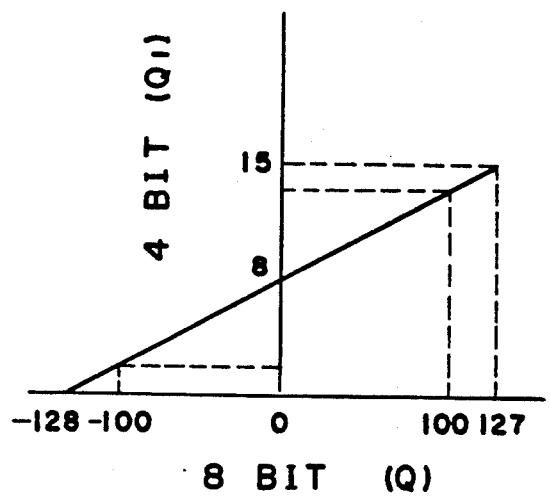
Figure 4A:
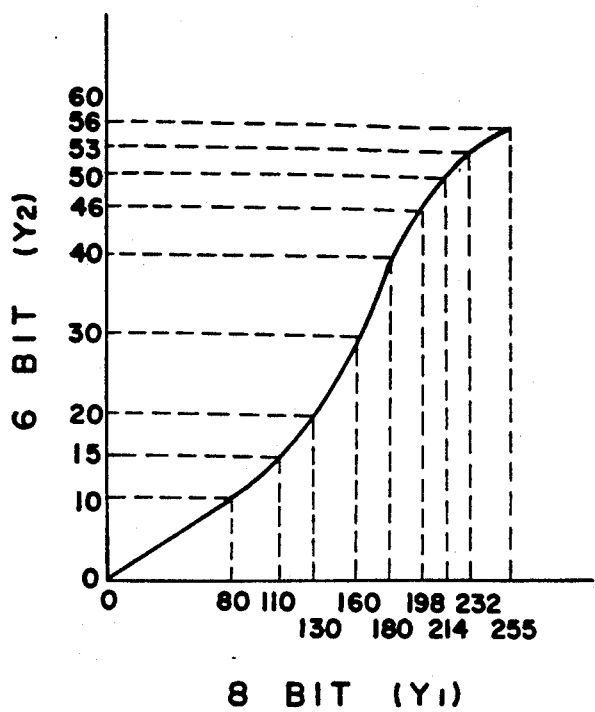
FIGS. 4a, 4b and 4c are graphs showing non-linear compression of luminance data (Y) and chrominance data (I, Q) according to a first embodiment.
Figure 4B:
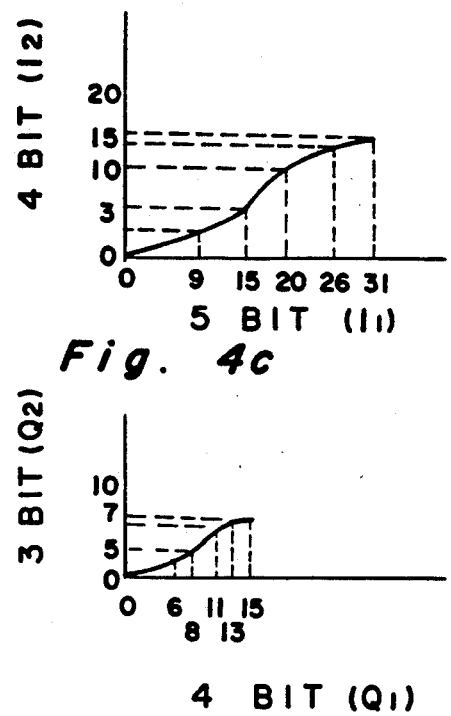
Figure 4C:
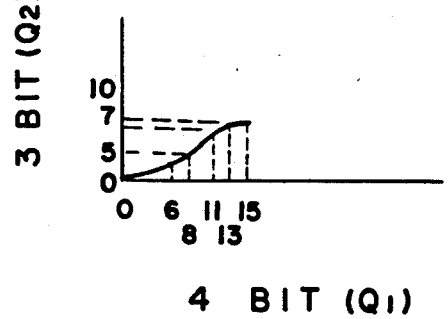

Encoder 3 may be a type which carries out two step compression: the first compression is a linear compression as shown in FIGS. 2a, 2b and 2c to obtain Y1, I1 and Q1 data and thereafter, carries out the second compression which is a non-linear compression as shown in FIGS. 4a, 4b and 4c to obtain Y2, I2 and Q2 data. Alternatively, according to a preferred embodiment, encoder 3 is a type which carries out one step compression: the compression from Y, I and Q data to Y2, I2 and Q2 data using a table stored in first memory 8. For the better understanding of the invention, the description hereinbelow is directed to the two step compression.

The first compression, i.e., the linear compression, is effected in a manner shown in FIGS. 2a, 2b and 2c, which is already explained above.

The second compression, i.e., the non-linear compression, which is the outstanding feature of the present invention, is effected in consideration of visual recognition characteristics of human eyes, such that fine quantization is effected where the human eyes are sensitive and coarse quantization is effected where the human eyes are less sensitive, as explained below. In other words, for an area where the image is relatively bright or dark for human eyes, rough data analyzing is effected, and for an area where the image has a moderate brightness, fine data analyzing is effected. According to the first embodiment, the step size is changed to change between rough and fine analyzing. Thus, the term step size, used herein, signifies the level difference between two neighboring quantized values. The step sizes given herein are measured based on the results obtained from the linear compression, thus for data Y1, 256 levels are provided; for data I1, 32 levels are provided; and for data Q1, 16 level are provided.

For example, for the luminance data Y, a region A is defined as having a step size of 2 and yet the color changes naturally between adjacent color quantized values. A region B is defined as having a step size of 3 and yet the color changes naturally between adjacent color quantized values. Similarly, regions C, D and E are defined as having step sizes of 4, 6 and 8, respectively.

According to one example, the regions A, B, C, D and E for the luminance data are empirically obtained as indicated below, and graphically shown in FIG. 5a.

$$\left.\begin{array}{l}\{Y1 \in A|\ 160 \leq Y1 \leq 179\} \\ \{Y1 \in B|\ 130 \leq Y1 \leq 159, 180 \leq Y1 \leq 197\} \\ \{Y1 \in C|\ 110 \leq Y1 \leq 129, 198 \leq Y1 \leq 213\} \\ \{Y1 \in D|\ 80 \leq Y1 \leq 109, 214 \leq Y1 \leq 231\} \\ \{Y1 \in E|\ 0 \leq Y1 \leq 79, 232 \leq Y1 \leq 255\}\end{array}\right\} \quad (3)$$

Figure 5A:
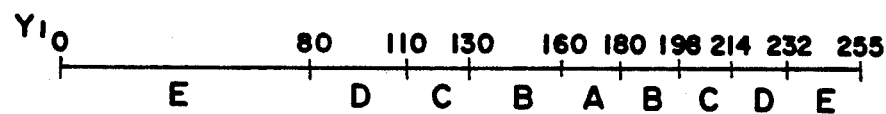
FIGS. 5a, 5b and 5c are diagrams showing regions of different step sizes for data Y1, I1 and Q1.

As apparent from the above formula (3) and the graph shown in FIG. 5a, the region E in a range $0 \leq Y1 \leq 79$ takes the step size of 8, and thus ten $(80 \div 8 = 10)$ quantized values representing ten different levels are obtained from this range. Similarly, a range $80 \leq Y1 \leq 109$ is denoted as region D having the step size of 6. Thus, five $(30 \div 6 = 5)$ quantized values are present from this range. The sampled points represent Y2 data. The relationship between Y1 data and Y2 data is shown in FIG. 4a, which indicates that Y1 data expressed by 8 bit digits for covering 256 levels can be compressed to Y2 data expressed by 6 bit digits covering 57 levels.

For example, for the first and second chrominance data I and Q, regions A and B are defined as the same as those defined for the luminance data Y. A region O is further defined as having a step size of 1 and yet the color changes naturally between adjacent color quantized values.

According to one example, the regions A, B, and O for the first and second chrominance data are empirically obtained as indicated below, and graphically shown in FIGS. 5b and 5c.

$$\left.\begin{array}{l}\{I1 \in O|\ 15 \leq I1 \leq 19\} \\ \{I1 \in A|\ 9 \leq I1 \leq 14, 20 \leq I1 \leq 25\} \\ \{I1 \in B|\ 0 \leq I1 \leq 8, 26 \leq I1 \leq 31\}\end{array}\right\} \quad (4)$$

$$\left.\begin{array}{l}\{Q1 \in O|\ 8 \leq Q1 \leq 10\} \\ \{Q1 \in A|\ 6 \leq Q1 \leq 7, 11 \leq Q1 \leq 12\} \\ \{Q1 \in B|\ 0 \leq Q1 \leq 5, 13 \leq Q1 \leq 15\}\end{array}\right\} \quad (5)$$

Figure 5B:
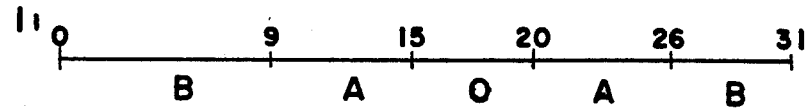

As apparent from the above formula (4) and the graph shown in FIG. 5b, the region B in a range $0 \leq I1 \leq 8$ takes the step size of 3, and thus three $(9 \div 3 = 3)$ quantization values representing three different levels are obtained from this range. Similarly, a range $9 \leq I1 \leq 14$ is denoted as region A having the step size of 2. Thus, three (6÷2=3) quantized values are obtained from this range. The sampled points represent I2 data. The relationship between I1 data and I2 data is shown in FIG. 4b, which indicates that I1 data expressed by 5 bit digits for covering 32 levels can be compressed to I2 data expressed by 4 bit digits covering 16 levels.

Figure 5C:
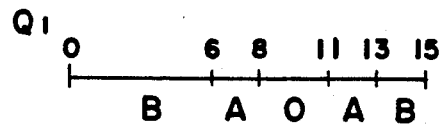

Also, as apparent from the above formula (5) and the graph shown in FIG. 5c, the region B in a range $0 \leq Q1 \leq 5$ takes the step size of 3, and thus two (6÷3=2) quantized values representing three different levels are obtained from this range. Similarly, a range $6 \leq Q1 \leq 7$ is denoted as region A having the step size of 2. Thus, one (2÷2=1) quantization value is obtained from this range. The sampled points represent Q2 data. The relationship between Q1 data and Q2 data is shown in FIG. 4c, which indicates that Q1 data expressed by 4 bit digits for covering 16 levels can be compressed to Q2 data expressed by 3 bit digits covering 8 levels.

Figure 6A:
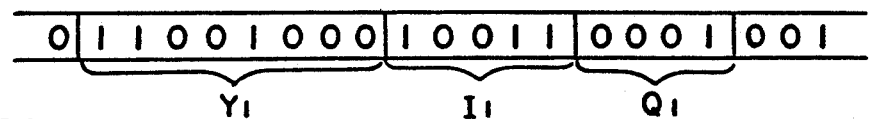
FIGS. 6a, 6b and 6c are diagrams showing tracks recorded with compressed luminance data (Y) and compressed chrominance data (I, Q)

For the two step compression, memory 8 carries a table for the conversion from Y1, I1 and Q1 data to Y2, I2 and Q2 data. In this case encoder 3 should first carry out the linear compression as in a manner carried out in the prior art encoder 13. Alternatively, according to the preferred embodiment, memory 8 carries a table for the compression from Y, I and Q data to Y2, I2 and Q2 data for one step compression. The compressed data Y2, I2 and Q2 are recorded on a recording medium, such as on a floppy disk (not shown), in recording/play device 4 such that Y2, I2 and Q2 data are repeatedly recorded along a recording track in a manner shown in FIG. 6b. One set of Y2, I2 and Q2 data represent one pixel. Since Y2, I2 and Q2 data consist of 6 bits, 4 bits and 3 bits, respectively, it takes 13 bits in total to represent one pixel. In this respect, according to the prior art method employing only the linear compression, it takes 17 bits in total to present one pixel, as shown in FIG. 6a.

Play

The recorded data are read out from the recording medium in recording/play device 4, and the read out data is divided from the beginning in to 6-bit, 4-bit and 3-bit data repeatedly to produce Y2, I2 and Q2 data repeatedly.

In decoder 5, Y2, I2 and Q2 data are decoded to produce Y, I and Q data using a table stored in second memory 9. The data in the table in second memory 9 is determined, for example, by the following formulas (6), (7) and (8).

$$\left.\begin{array}{ll}\text{When } 0 \leq Y2 \leq 9, & Y = 8 \times Y2 + 4. \\ \text{When } 10 \leq Y2 \leq 14, & Y = 6 \times (Y2\text{-}10) + 3 + 80. \\ \text{When } 15 \leq Y2 \leq 19, & Y = 4 \times (Y2\text{-}15) + 2 + 110. \\ \text{When } 20 \leq Y2 \leq 29, & Y = 3 \times (Y2\text{-}20) + 2 + 130. \\ \text{When } 30 \leq Y2 \leq 39, & Y = 2 \times (Y2\text{-}30) + 1 + 160. \\ \text{When } 40 \leq Y2 \leq 45, & Y = 3 \times (Y2\text{-}40) + 2 + 180. \\ \text{When } 46 \leq Y2 \leq 49, & Y = 4 \times (Y2\text{-}46) + 2 + 198. \\ \text{When } 50 \leq Y2 \leq 52, & Y = 6 \times (Y2\text{-}50) + 3 + 214. \\ \text{When } 53 \leq Y2, & Y = 8 \times (Y2\text{-}53) + 4 + 232.\end{array}\right\} \quad (6)$$

$$\left.\begin{array}{ll}\text{When } 0 \leq I2, & I1 = 3 \times I2 + 1. \\ \text{When } 3 \leq I2 \leq 5, & I1 = 2 \times (I2\text{-}3) + 10. \\ \text{When } 6 \leq I2 \leq 10, & I1 = 1 \times (I2\text{-}6) + 15. \\ \text{When } 11 \leq I2 \leq 13, & I1 = 2 \times (I2\text{-}11) + 21. \\ \text{When } 14 \leq I2, & I1 = 2 \times (I2\text{-}14) + 27. \\ \text{And } I \text{ is obtained by:} & I = 8 \times I1 + 4 - 128.\end{array}\right\} \quad (7)$$

$$\left.\begin{array}{ll}\text{When } 0 \leq Q2 \leq 2, & Q1 = 3 \times Q2 + 1. \\ \text{When } Q2 = 2, & Q1 = 2 \times (Q2\text{-}2) + 7 = 7. \\ \text{When } 3 \leq Q2 \leq 5, & Q1 = 1 \times (Q2\text{-}3) + 8. \\ \text{When } Q2 = 6, & Q1 = 2 \times (Q2\text{-}6) + 12 = 12. \\ \text{When } Q2 = 7, & Q1 = 3 \times (Q2\text{-}7) + 14 = 14. \\ \text{And } Q \text{ isobtained by:} & Q = 16 \times Q1 + 8 - 128.\end{array}\right\} \quad (8)$$

Figure 6B:
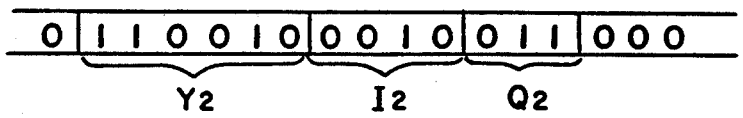

Thus, when Y2=50, I2=2 and Q2=3, as an example shown in FIG. 6b, the result would be Y=217, I=−68 and Q=0 using the table stored in second memory 9. The obtained Y, I, Q data is then converted to R, G and B data in RGB converter 6. Based on the R, G and B data, a color image is shown on display device 7.

Second Embodiment

The second embodiment has the same construction as that shown in FIG. 3, but the data compression effected in encoder 3 is different from that of the first embodiment.

Recording

In the first embodiment, the non-linear compression is effected with no consideration of correlation among Y, I and Q data, i.e., between luminance and chrominance data. On this respect, according to the second embodiment the non-linear compression is effected with consideration of relation luminance and chrominance data, i.e., between Y1 data and I1 data or between Y1 data and Q1 data. Thus, according to the second embodiment, not only the step size is changed, but also the data length of chrominance data (I and Q) is change relatively to luminance (Y) data, so as to change between rough and fine analyzing.

Figure 7A:
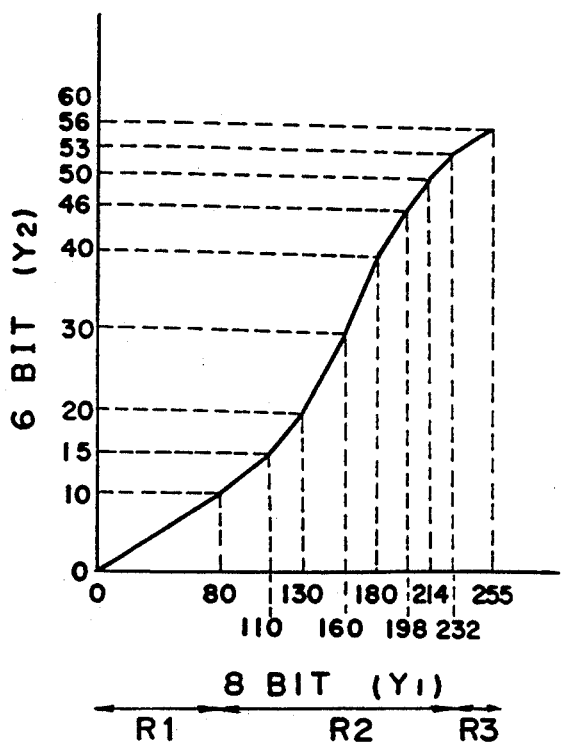
FIGS. 7a, 7b and 7c are graphs showing non-linear compression of luminance data (Y) and chrominance data (I, Q) according to a second embodiment.

For example, when Y1 is in a range R2 ($80 \leq Y1 \leq 231$) as shown in FIG. 7a, I1 data and Q1 data are compressed non-linearly in accordance with formulas (4) and (5) which are graphically shown in FIGS. 4b and 4c. However, when Y1 is in a range R1 ($0 \leq Y1 \leq 79$) or in a range R3 ($232 \leq Y1 \leq 255$) as shown in FIG. 7a, I1 data and Q1 data are compressed non-linearly in accordance with formulas (9) and (10), which are graphically shown in FIGS. 7b and 7c.

$$\left.\begin{array}{l}\{I1 \in B | \ 18 \leq I1 \leq 23\} \\ \{I1 \in C | \ 6 \leq I1 \leq 17, 24 \leq I1 \leq 31\} \\ \{I1 \in D | \ 0 \leq I1 \leq 5\}\end{array}\right\} \quad (9)$$

$$\left.\begin{array}{l}\{Q1 \in B | \ 6 \leq Q1 \leq 11\} \\ \{Q1 \in C | \ 12 \leq Q1 \leq 15\} \\ \{Q1 \in D | \ 0 \leq Q1 \leq 5\}\end{array}\right\} \quad (10)$$

Figure 7B:
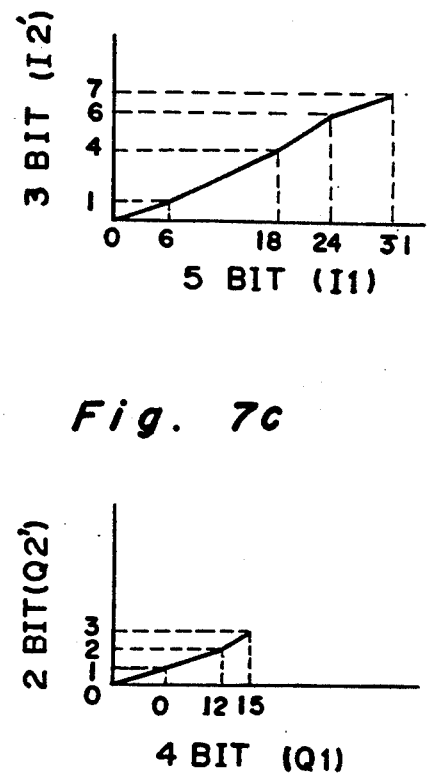

As apparent from the above formula (9) and the graph shown in FIG. 7b, the region D in a range $0 \leq I1 \leq 5$ takes the step size of 6, and thus three ($6 \div 6 = 1$) quantization values representing one different level is obtained from this range. Similarly, a range $6 \leq I1 \leq 17$ is denoted as region C having the step size of 4. Thus, three ($12 \div 4 = 3$) quantization values are obtained from this range, and so on. The sampled points represent I2' data. The relationship between I1 data and I2' data is shown in FIG. 7b, which indicates that I1 data expressed by 5 bit digits for covering 32 levels can be compressed to I2' data expressed by 3 bit digits covering 8 levels.

Figure 7C:
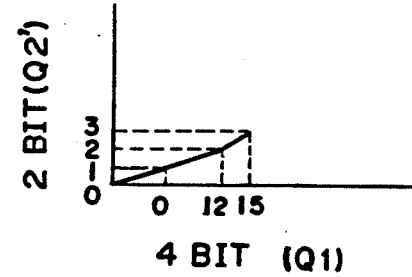

Also, as apparent from the above formula (10) and the graph shown in FIG. 7c, the region D in a range $0 \leq Q1 \leq 5$ takes the step size of 6, and thus one ($6 \div 6 = 1$) quantization value representing one different level is obtained from this range. Similarly, a range $6 \leq Q1 \leq 11$ is denoted as region B having the step size of 3. Thus, two ($6 \div 3 = 2$) quantization values are obtained from this range, and so on. The sampled points represent Q2' data. The relationship between Q1 data and Q2' data is shown in FIG. 7c, which indicates that Q1 data expressed by 4 bit digits for covering 16 levels can be compressed to Q2' data expressed by 2 bit digits covering 4 levels.

According to the second embodiment, memory 8 carries a table for the conversion from Y1, I1 and Q1 data to Y2, I2 (or I2') and Q2 (or Q2') data. The compressed data Y2, I2 (or I2') and Q2 (or Q2') are recorded on a recording medium, such as on a floppy disk (not shown), in a similar manner described above. According to the second embodiment, although data Y2, I2 (or I2') and Q2 (or Q2') data are recorded repeatedly along a recording track, the data length for one pixel is not constant. One pixel data length is 13 bit when constituting data are Y2, I2 and Q2, and 11 bit when constituting data are Y2, I2' and Q2'. Thus, when compared with the first embodiment, the data can be further compressed.

Figure 8:
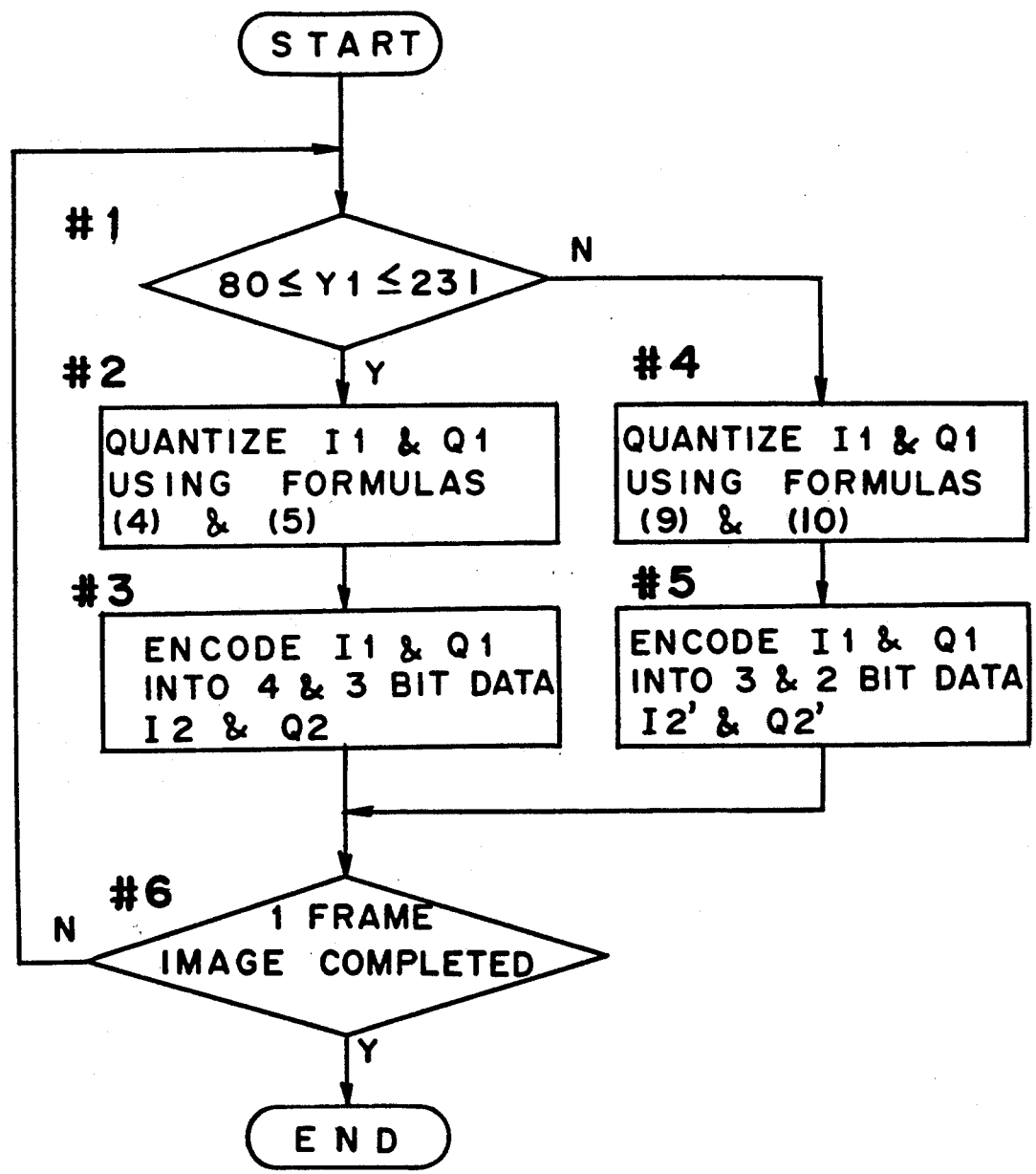
FIG. 8 is a flow chart showing an operation for compressing data Y, I, Q according the second embodiment.

Referring to FIG. 8, an operation of the data compression according to the second embodiment is shown. At step #1, it is detected whether or not data Y1 is in range R2 ($80 \leq Y1 \leq 231$). If yes, steps #2 and #3 are carried out to compress data I1 and Q1 into data I2 (4 bit) and Q2 (3 bit), respectively. If no, steps #4 and #5 are carried out to compress data I1 and Q1 into data I2' (3 bit) and Q2' (2 bit), respectively. Then, at step #6, it is checked whether or not the data compression for one frame is completed.

Play

The recorded data are read out from the recording medium in recording/play device 4, and the read out data is divided from the beginning in to 6-bit, 4-bit and 3-bit data or 6-bit, 3-bit and 2-bit data repeatedly to produce Y2, I2 and Q2 data repeatedly.

In decoder 5, Y2, I2 (or I2') and Q2 (or Q2') data are decoded to produce Y, I and Q data using a table stored in second memory 9. The data in the table in second memory 9 is determined, for example, by the following formulas (11) and (12).

$$\left. \begin{array}{ll} \text{When } 0 = I2, & I1 = 6 \times I2 + 4 = 4. \\ \text{When } 1 \leq I2 \leq 2, & I1 = 4 \times (I2-1) + 8. \\ \text{When } 3 \leq I2 \leq 4, & I1 = 3 \times (I2-3) + 5. \\ \text{When } 5 \leq I2, & I1 = 4 \times (I2-5) + 22. \\ \text{And } I \text{ is obtained by:} & I = 8 \times I1 + 4 - 128. \end{array} \right\} \quad (11)$$

-continued $$\left. \begin{array}{ll} \text{When } 0 = Q2. & Q1 = 6 \times Q2 + 4 = 4. \\ \text{When } 1 \leq Q2 \leq 2, & Q1 = 3 \times (Q2-1) + 7. \\ \text{When } Q2 = 3, & Q1 = 4 \times (Q2-3) + 14 = 14. \\ \text{And } Q \text{ is obtained by:} & Q = 16 \times Q1 + 8 - 128. \end{array} \right\} \quad (12)$$

Figure 6C:
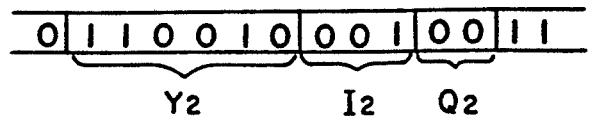

Thus, when Y2=50, I2=1 and Q2=0, as an example shown in FIG. 6c, the result would be Y=217, I=−60 and Q=−56 using the table stored in second memory 9. The obtained Y, I, Q data is then converted to R, G and B data in RGB converter 6. Based on the R, G and B data, a color image is shown on display device 7.

Figure 9:
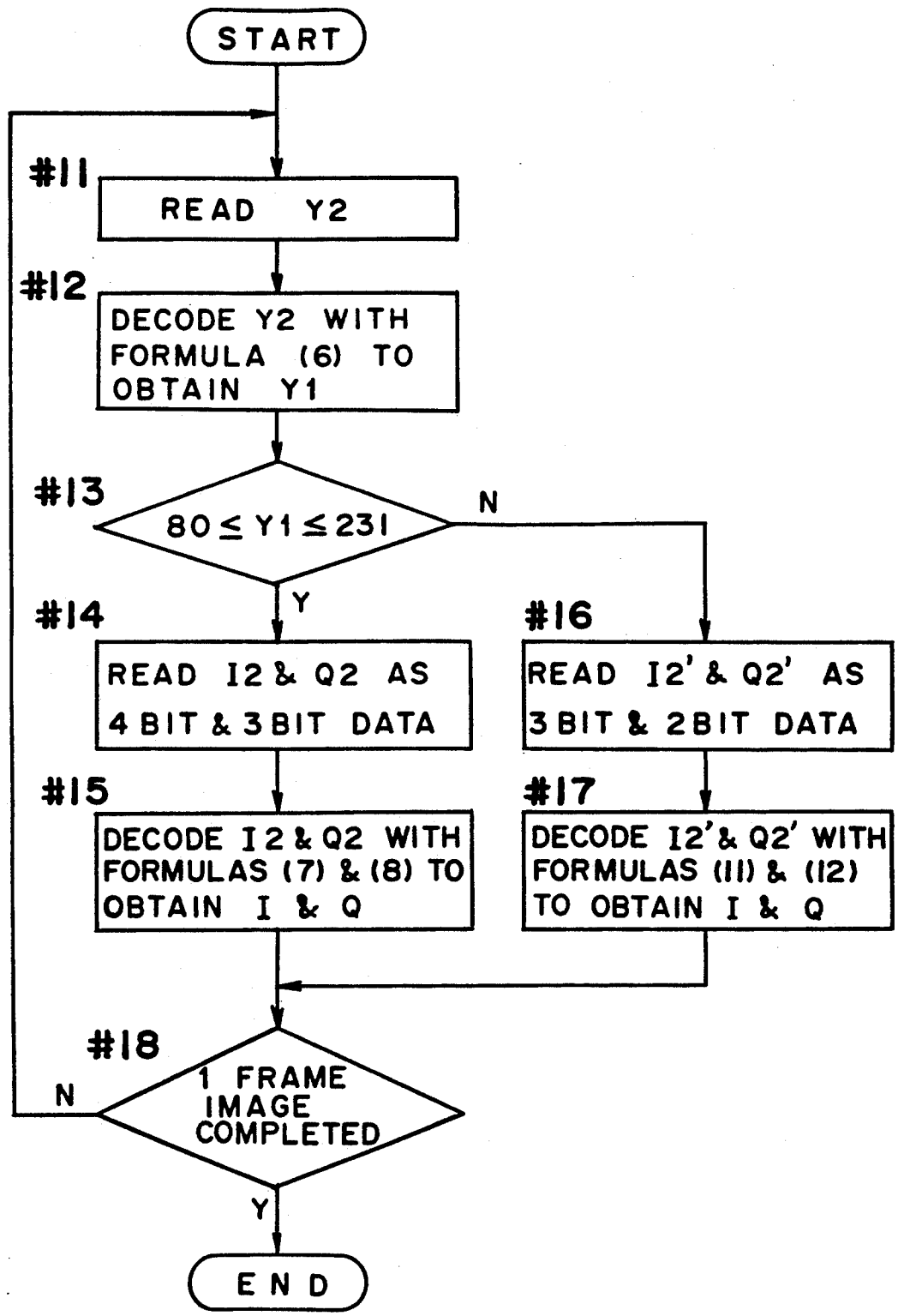
FIG. 9 is a flow chart showing an operation for expanding the compressed data according to the second embodiment.

Referring to FIG. 9, an operation of the data expansion according to the second embodiment is shown. At step #11, 6 bit data Y2 is read out from the recoding medium, and at step #12, data Y2 is decoded to data Y1 in accordance with formula (6). Then, at step #13, it is detected whether or not data Y1 is in range R2 ($80 \leq Y1 \leq 231$).

If yes, step #14 is carried out to separate the following 4 bits and 3 bits to obtain I2 and Q2 data and, at step #15, data I2 and Q2 are decoded to obtain data I and Q in accordance with formulas (7) and (8), respectively.

If no, step #16 is carried out to separate the following 3 bits and 2 bits to obtain I2' and Q2' data and, at step #17, data I2' and Q2' are decoded to obtain data I and Q in accordance with formulas (11) and (12), respectively. Then, at step #18, it is checked whether or not the data compression for one frame is completed.

According to the present invention, since the luminance data and chrominance data are compressed in the regions where the human eyes are less sensitive, the color image data can be compressed efficiently without deteriorating the reproduced image.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A compressing apparatus for compressing color image data including R, G and B data, said apparatus comprising:

a first converter for converting said R, G and B data into luminance data and chrominance data;

first encoder means for encoding said luminance data to compressed luminance data, through fine quantization at regions where human eyes are sensitive, and through coarse quantization at regions where human eyes are less sensitive; and second encoder means for encoding said chrominance data to compressed chrominance data, through fine quantization at regions where human eyes are sensitive, and through coarse quantization at regions where human eyes are less sensitive;

said first encoder means comprising a first memory for storing a table for changing luminance data to compressed luminance data.

2. A compressing apparatus for compressing color image data including R, G and B data, said apparatus comprising:

a first converter for converting said R, G and B data into luminance data and chrominance data;

first encoder means for encoding said luminance data to compressed luminance data, through fine quantization at regions where human eyes are sensitive, and through coarse quantization at regions where human eyes are less sensitive; and second encoder means for encoding said chrominance data to compressed chrominance data, through fine quantization at regions where human eyes are sensitive, and through coarse quantization at regions where human eyes are less sensitive;

said second encoder means comprising a first memory for storing a table for changing chrominance data to compressed chrominance data.

3. An apparatus as claimed in claim 1, further comprising a recording/play means for recording and playing said compressed luminance data and compressed chrominance data.

4. An apparatus as claimed in claim 1, further comprising:

recording/play means for recording and playing said compressed luminance data and compressed chrominance data;

first decoder means for decoding said compressed luminance data back to said luminance data; and second decoder means for decoding said compressed chrominance data back to said chrominance data;

said first decoder means comprising second memory means for storing a table for changing compressed luminance data to luminance data.

5. An apparatus as claimed in claim 2, further comprising:

recording/play means for recording and playing said compressed luminance data and compressed chrominance data;

first decoder means for decoding said compressed luminance data back to said luminance data; and second decoder means for decoding said compressed chrominance data back to said chrominance data;

said second decoder means comprising second memory means for storing a table for changing compressed chrominance data to chrominance data.

6. A compressing apparatus for compressing color image data including R, G and B data, said apparatus comprising:

a first converter for converting said R, G and B data into luminance data and chrominance data;

first encoder means for encoding said luminance data to compressed luminance data, through fine quantization at regions where human eyes are sensitive, and through coarse quantization at regions where human eyes are less sensitive; and second encoder means for encoding said chrominance data to compressed chrominance data, through fine quantization at regions where human eyes are sensitive, and through coarse quantization at regions where human eyes are less sensitive, and also through reducing the chrominance data word lengths by shortening the chrominance data word lengths when the magnitude of the luminance, as indicated by the luminance data, is above a predetermined first threshold or below a predetermined second threshold, wherein said predetermined first threshold is greater than said predetermined second threshold.

7. A method for compressing color image data including R, G and B data, said method comprising steps of:

converting said R, G and B data into luminance data and chrominance data;

encoding said luminance data to compressed luminance data, through fine quantization at regions where human eyes are sensitive, and through coarse quantization at regions where human eyes are less sensitive; and encoding said chrominance data to compressed chrominance data, through fine quantization at regions where human eyes are sensitive, and through coarse quantization at regions where human eyes are less sensitive, and also through reducing the chrominance data word lengths by shortening the chrominance data word lengths when the magnitude of the luminance, as indicated by the luminance data, is above a predetermined first threshold or below a predetermined second threshold, wherein said predetermined first threshold is greater than said predetermined second threshold.

* * * * *